United States Patent [19]

Maeda et al.

[11] Patent Number: 4,593,170
[45] Date of Patent: Jun. 3, 1986

[54] FOOD FRYING APPARATUS

[75] Inventors: Masahiko Maeda; Masaharu Takashima; Masahira Takeuchi, all of Shiga, Japan

[73] Assignee: Sanyo Electric Co., Ltd., Japan

[21] Appl. No.: 463,511

[22] Filed: Feb. 3, 1983

[30] Foreign Application Priority Data

Feb. 9, 1982 [JP] Japan ................................. 57-20556

[51] Int. Cl.$^4$ ............................................. H05B 6/64
[52] U.S. Cl. ....................... 219/10.55 E; 219/10.55 B; 99/336; 99/403
[58] Field of Search ................. 219/10.55 E, 10.55 M, 219/10.55 R, 10.55 B; 99/336, 403, 410, 411, 418

[56] References Cited

U.S. PATENT DOCUMENTS 2,868,112 1/1959 Bushway ............................... 99/410
2,997,566 8/1961 Pierce et al. .................. 219/10.55 E

FOREIGN PATENT DOCUMENTS 52-70453 6/1977 Japan .

Primary Examiner—Clarence L. Albritton
Assistant Examiner—M. M. Lateef
Attorney, Agent, or Firm—Darby & Darby

[57] ABSTRACT

A food frying apparatus comprises a heating chamber (1), a heater (H), a magnetron, a food table (7), a lifting apparatus (8) and a control apparatus. A cooking oil is contained in a lower portion of the heating chamber (1). The cooking oil is heated to higher temperature by the heater (H). After placing food on the table (7), the table (7) is lowered by the lifting apparatus (8) so that the food is dipped into the cooling oil, and frying of the food is started. If and when the table (7) is lowered, irradiation of a microwave from the magnetron is started and the food is internally heated. The control apparatus controls the temperature of said cooking oil, a time period for dipping the food into the cooking oil and a time period for supplying the microwave. Therefore, in accordance with the present invention, the food can be dipped into the cooking oil with high temperature automatically and for an arbitrary time period and in addition, irradiation of the microwave can be made for an arbitrary time period.

9 Claims, 21 Drawing Figures

FIG.11-(1)
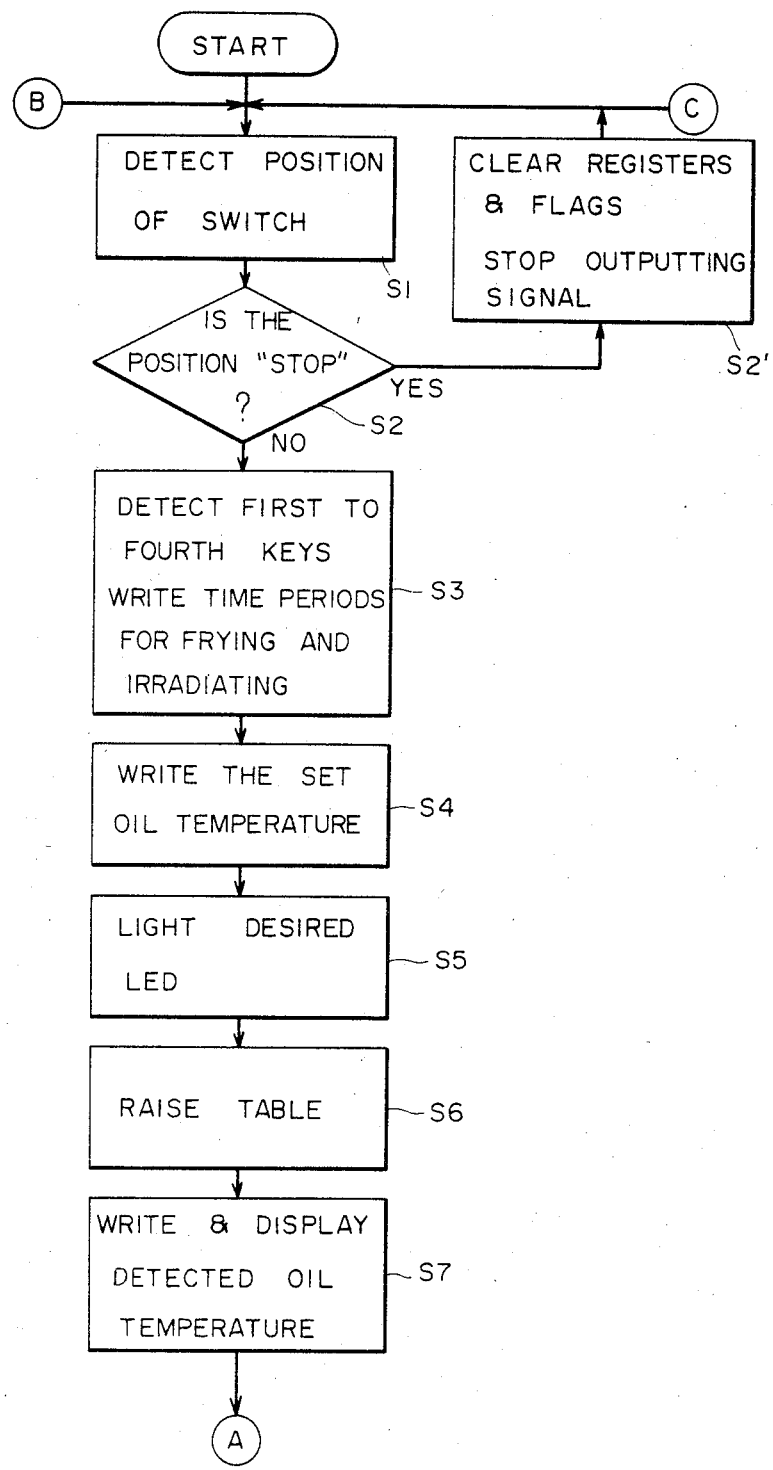

FIG. 11-(2)
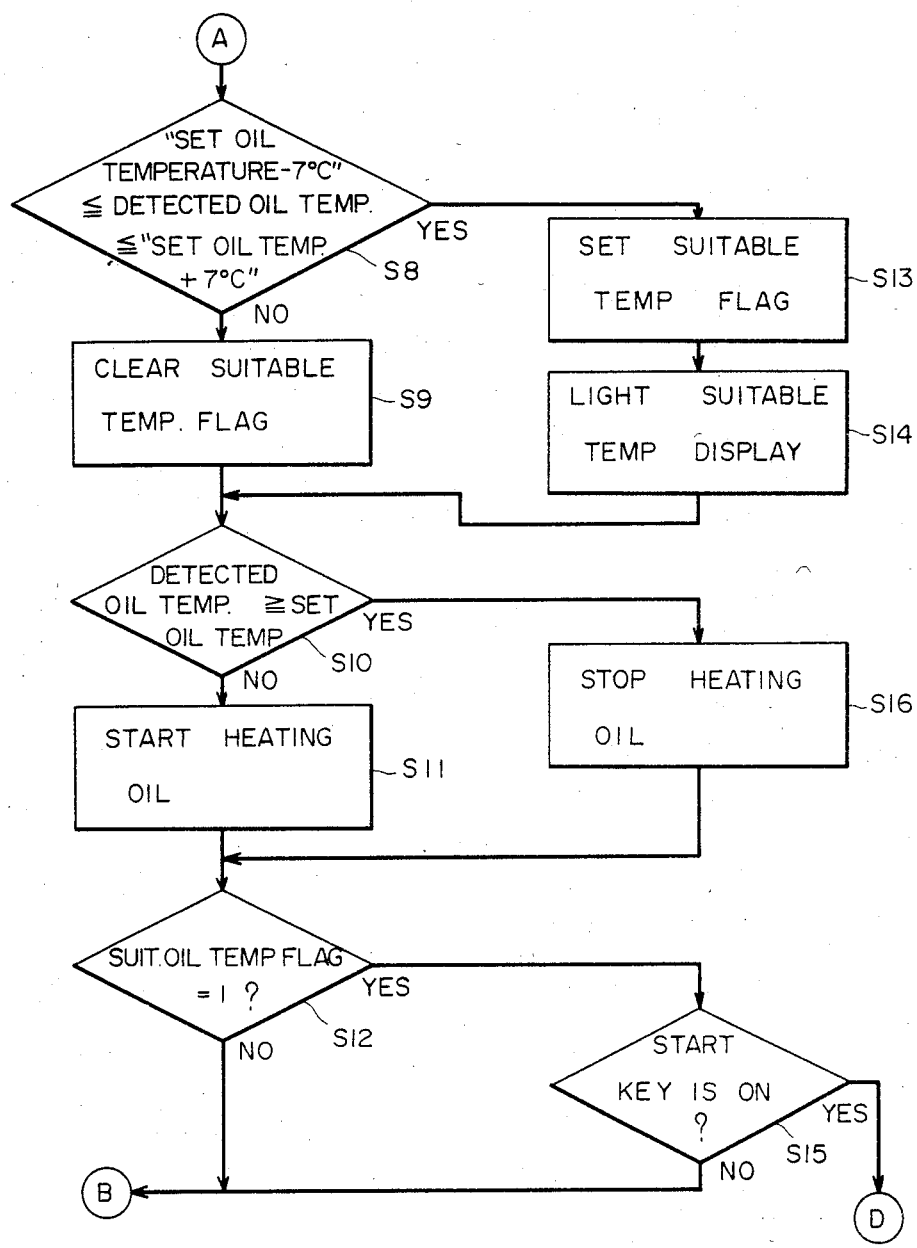

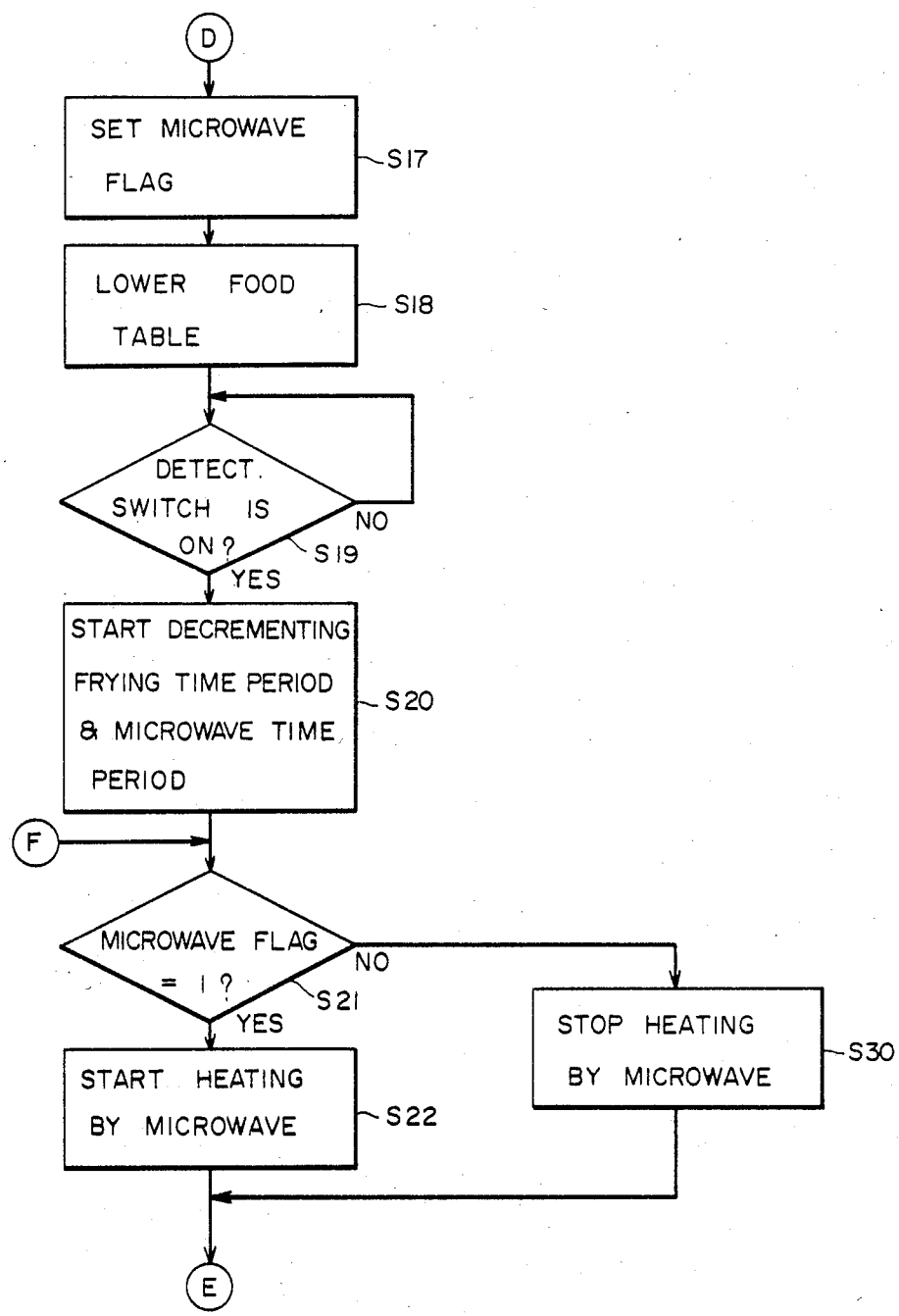
FIG.11-(3)

FIG. 11-(4)
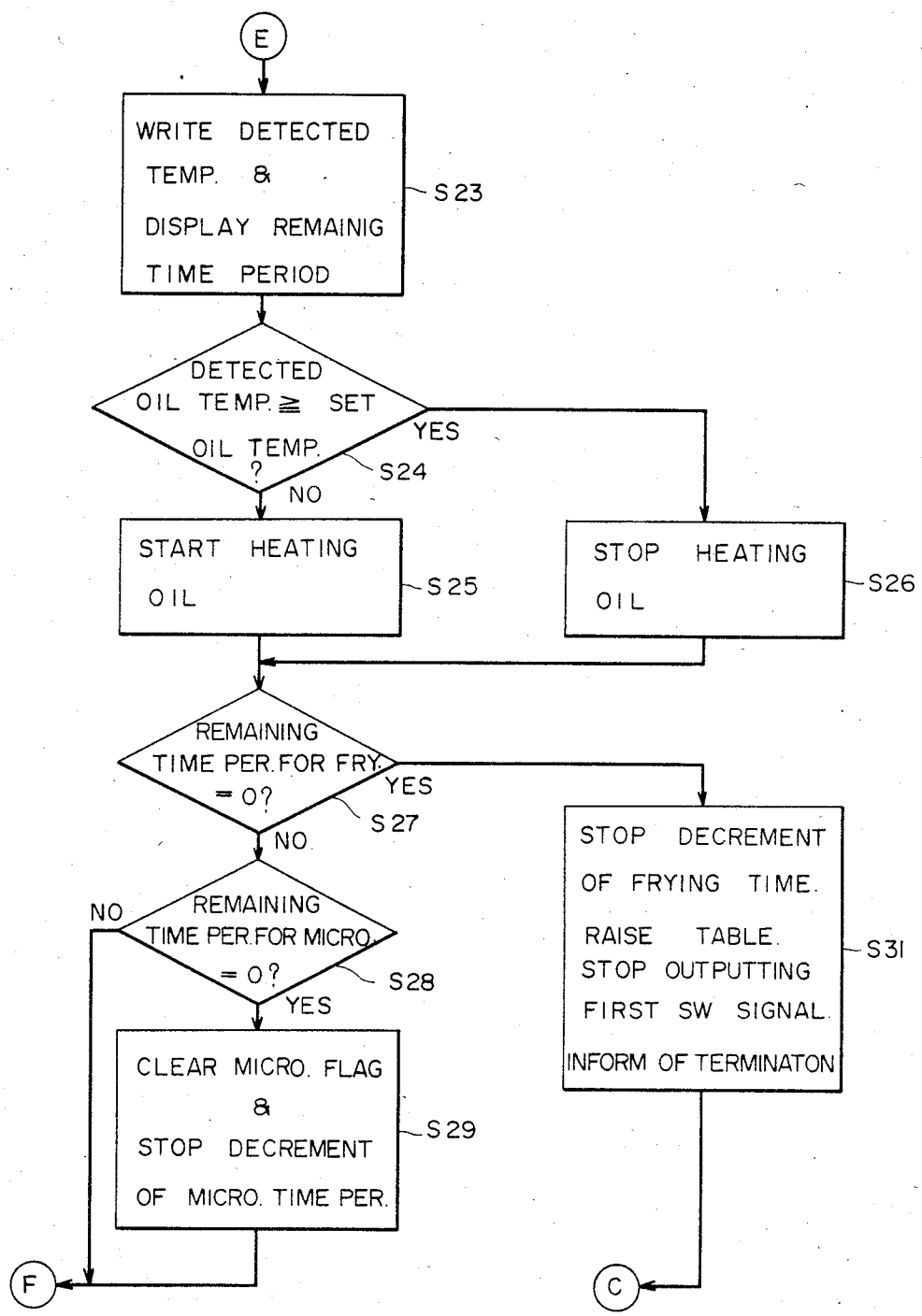

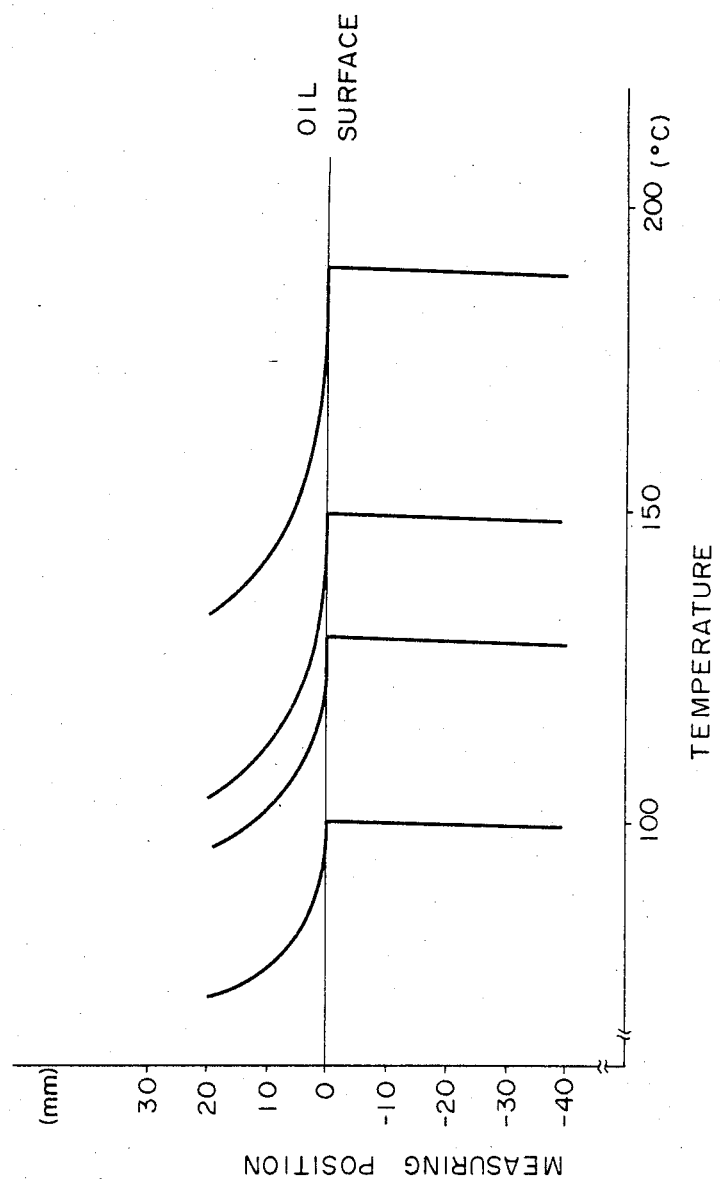

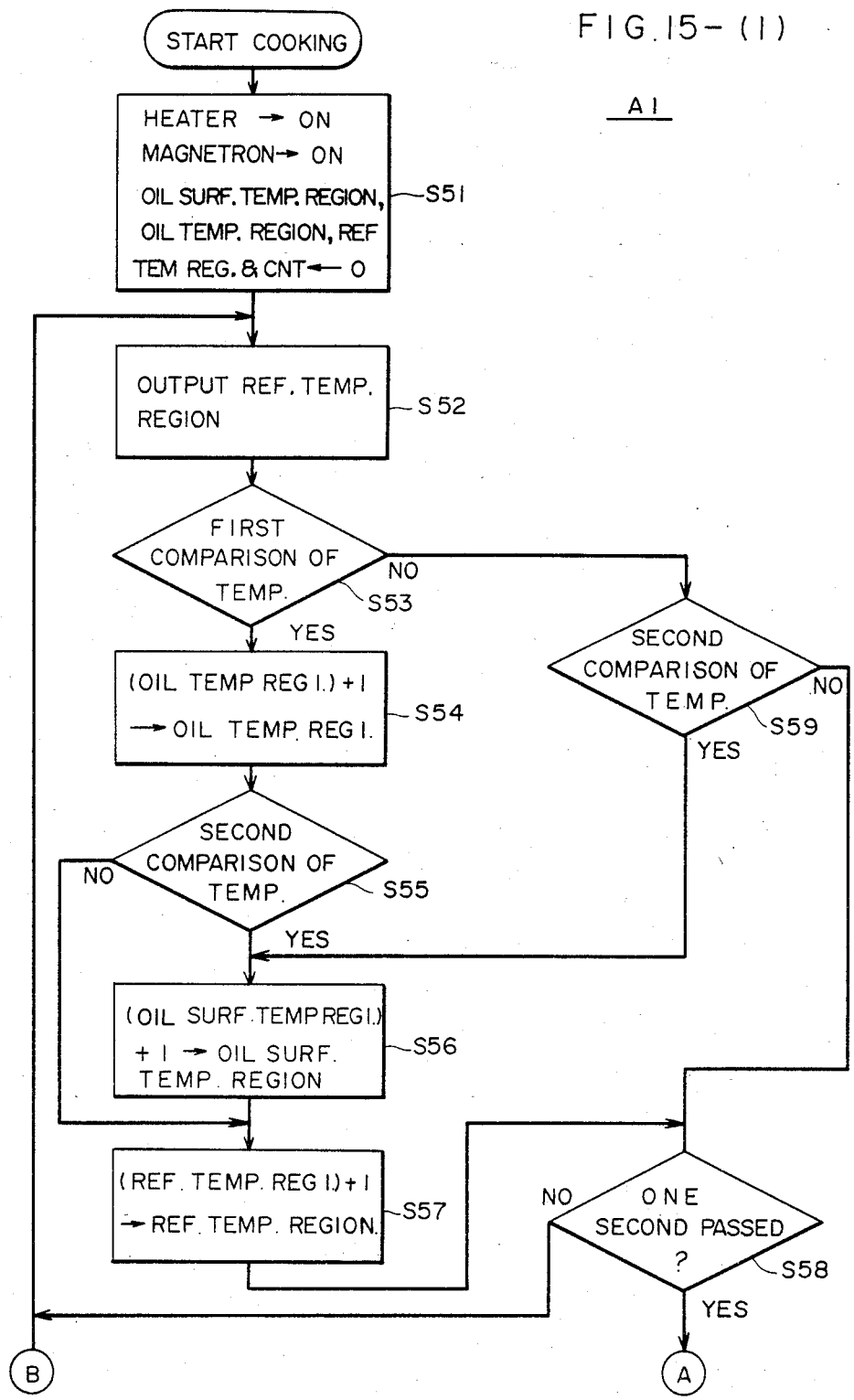
FIG.15-(1)

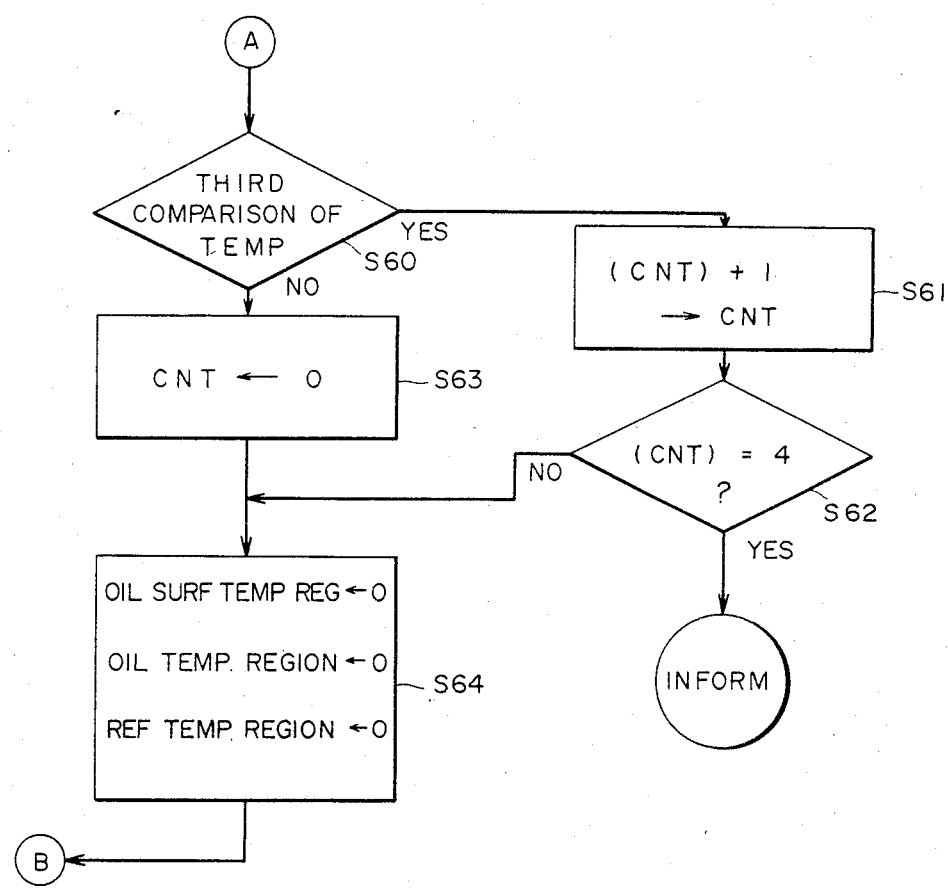
FIG. 15-(2)

FOOD FRYING APPARATUS

BACKGROUND OF THE INVENTION

1. Field of the Invention

The present invention relates to a food frying apparatus and more particularly, relates to a frying apparatus for frying food by irradiating a microwave into a cooking oil with the food being dipped into the cooking oil with high temperature.

2. Description of the Prior Art

In a food frying apparatus recently proposed, in order to reduce a time period for frying food, heating by a microwave as well as heating by a cooking oil has been adopted. More particularly, since generally dielectric loss of the food is considerably larger as compared with dielectric loss of the cooking oil, the microwave is almost absorbed into the food if the microwave is irradiated to the place where the food and the cooking oil exist. Accordingly, in a frying apparatus in which microwave heating is incorporated, the food is heated not only externally by the cooking oil but also internally by the microwave and hence the time period for frying the food is considerably reduced.

On the other hand, in such a frying apparatus, a completed condition of a fried food largely depends on a time period for dipping food into the cooking oil of high temperature and a time period for irradiating the microwave. In addition, in the light of the fact that the microwave is used, dipping of the food into the cooking oil and irradiation of the microwave must be made within a tightly closed heating chamber from which the microwave does not leak.

Accordingly, a food frying apparatus has been desired where dipping of the food into the cooking oil with high temperature within the tightly closed heating chamber can be made automatically for an arbitrary time period and also irradiation of the microwave can be made for an arbitrary time period.

SUMMARY OF THE INVENTION

In summary, the present invention is directed to a frying apparatus for frying food, comprising a heating chamber without leakage of a microwave and for housing the food, a cooking oil used for frying the food being provided at a lower portion of the heating chamber; heater means for heating the cooking oil; microwave supplying means for supplying the microwave into the heating chamber; a food table for food on which the food is placed; lifting means for lifting or lowering the table; and controlling means for controlling operations of the heater means, the microwave supplying means and the lifting means.

The cooking oil within the heating chamber is heated to high temperature by the heater. After placing the food on the table, the table is lowered by the lifting means so that the food is dipped into the cooking oil, and the frying is started. On the other hand, in response to lowering the table, irradiation of the microwave is started, so that the food is internally heated. The controlling means controls the temperature of the cooking oil, a time period for dipping the food into the cooking oil and a time period for irradiating of the microwave.

A principal object of the present invention is to provide a food frying apparatus capable of automatically dipping food into a cooking oil with high temperature within a tightly closed heating chamber for an arbitrary time period and also capable of automatically irradiating a microwave for an arbitrary time period.

A principal advantage in accordance with the present invention is to be capable of automatically dipping food into a cooking oil with high temperature within a tightly closed heating chamber for an arbitrary time period and capable of automatically irradiating a microwave for an arbitrary time period.

Another advantage in accordance with the present invention is that a completed condition of a fried food is good since the time period for dipping the food into the cooking oil with high temperature and the time period for irradiating the microwave to the food are automatically controlled to a predetermined time period.

A further advantage in accordance with the present invention is that a safe frying apparatus can be obtained since dipping of the food into a cooking oil with high temperature can be automatically controlled.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are schematic diagram showing an internal structure of a first embodiment of the present invention, wherein FIG. 1A is a sectional front elevation and FIG. 1B is a sectional side elevation;

FIG. 11-(1), 11-(2), 11-(3) and 11-(4) are flow charts of a program in a microcomputer shown in FIG. 9;

FIG. 12 is a graph showing variations of temperature in the vicinity of an oil surface in the heated oil, the temperature being measured with respect to the various oil temperature;

FIGS. 13A and 13B are schematic diagram showing an internal structure of a fourth embodiment of the present invention, wherein FIG. 13A is a sectional side elevation when an amount of a cooking oil is proper and FIG. 13B is a sectional side elevation when an amount of a cooking oil is less than a proper amount;

FIG. 15 is a flow chart of a program for sensing an amount of oil, the program being stored in a read only memory in the controlling portion shown in FIG. 14.

DESCRIPTION OF THE PREFERRED EMBODIMENTS

Figure 1A:
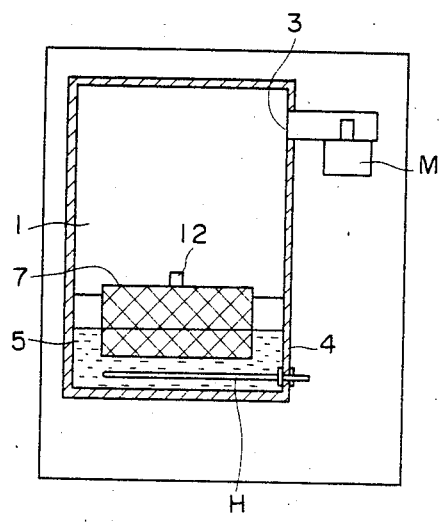

The first embodiment of the present invention will be described referring to the drawings.

Figure 1B:
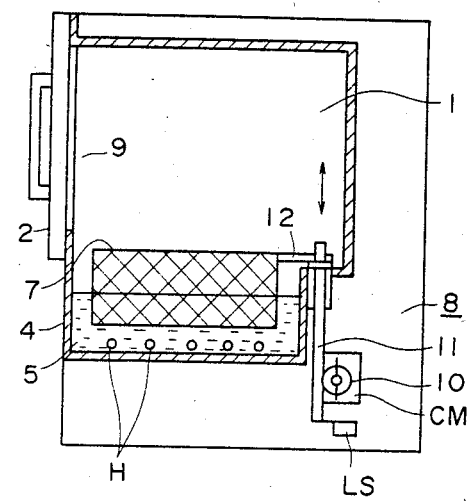

FIG. 1 is a schematic diagram showing an internal structure of a first embodiment of the present invention. FIG. 1A is a sectional front elevation and FIG. 1B is a sectional side elevation. A heating chamber 1 has a food entrance portion 9 tightly closed by a door 2 in such a manner that a microwave cannot leak from the chamber 1. A microwave is supplied into the heating chamber 1 through a feeding port 3 provided in an upper portion of the chamber 1 by a magnetron M. The heating chamber 1 is structured such that the microwave does not leak therefrom. An oil tank 4 for storing a cooking or edible oil 5 is provided in the lower portion of the heating chamber 1 and a heater H in a zigzag fashion is provided in the vicinity of the bottom of the oil tank 4. A metal-made basket table 7 is provided within the heating chamber 1, on which the food is placed. The table 7 is disposed such that it can be lifted or lowered by a lifting apparatus 8 with respect to an oil surface in the oil tank 4, so that the food placed on the table 7 is disposed over the oil surface when the table 7 is lifted up, and sinks under the oil surface when the table 7 is lowered. The lifting apparatus 8 comprises a driving motor CM, a gear 10 fixedly attached to a rotating shaft of the driving motor, a rack 11 engaged with the gear 10 for being lifted and lowered, and a supporting lever 12 coupled to an upper end of the rack 11 for supporting the table 7. The driving motor CM is a torque motor, for example. The same applies to the subsequent embodiments. A detecting switch LS including a limit switch, for example, is provided in the lower portion of the rack 11, wherein the detecting switch LS is rendered ON when the switch LS is depressed by a lower end of the rack 11 at the lowered position of the table 7, as shown in FIG. 1B.

Figure 2:
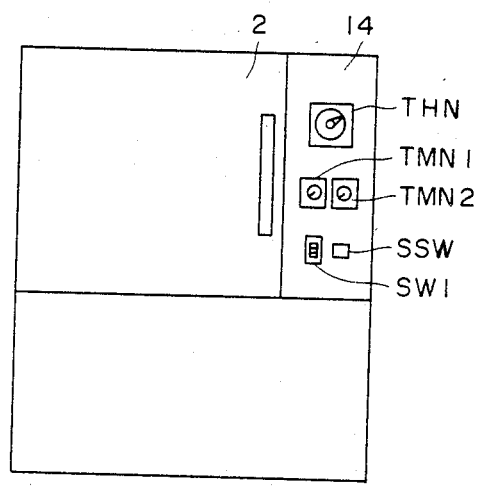
FIG. 2 is a schematic diagram showing a front structure of a first embodiment.

FIG. 2 is a schematic diagram showing a sectional front elevation of the first embodiment of the present invention. An operation panel 14 is juxtaposed with the door 2. The operation panel 14 is provided with a power source switch SW1, a start switch SSW, a first timer knob TMN1, a second timer knob TMN2 and a temperature adjusting knob THN. Now an operation of these switches and knobs and an operation of a frying apparatus will be briefly described in the following. If and when the power source switch SW1 is rendered ON in a waiting state, an electrical current is supplied to the heater H and the cooking oil 5 is heated up to the temperature set by the temperature adjusting knob THN and is held in the set temperature. Then, after placing the food on the table 7, a desired time period for irradiating the microwave is set by the first timer knob TMN1 and a desired time period for dipping the food into the cooking oil is set by the second timer knob TMN2. Lastly, in response to the ON of the start switch SSW, the table 7 is lowered and the food sinks into the oil, so that frying of the food is started and the food is irradiated by the microwave. The irradiation of the microwave is made only for the time period set by the first timer knob TMN1, so that the food is internally heated. If and when the time period set by the second timer knob TMN2 has passed, the table 7 is lifted and hence the food is taken out from the oil tank, and hence the food frying is completed. The above described operation will be described in more detail referring to FIGS. 3 and 4.

Figure 3:
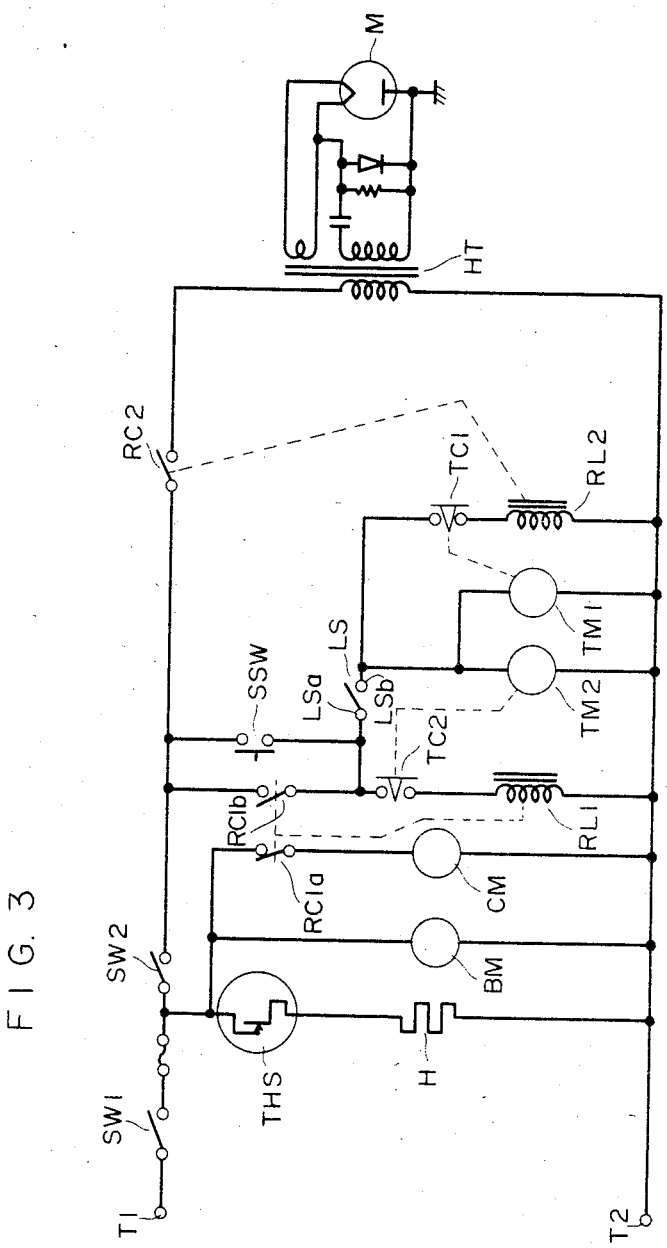
FIG. 3 is a circuit diagram showing an electrical circuit of a first embodiment.
Figure 4:
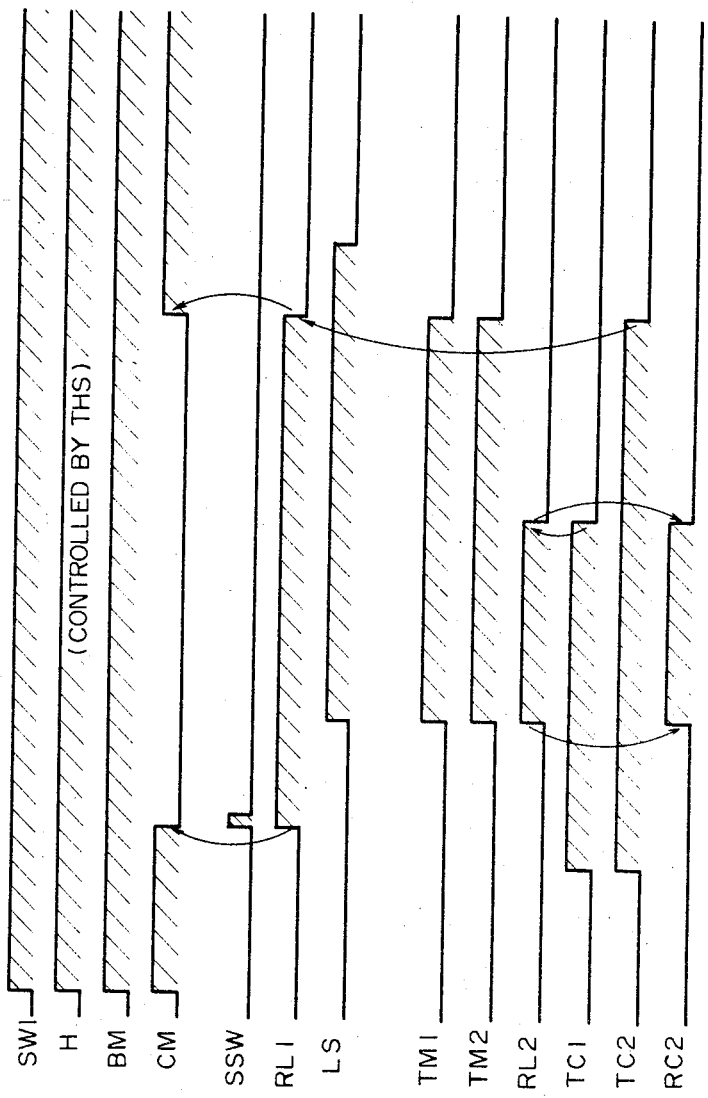
FIG. 4 is a time chart showing an operation of a circuit in FIG. 3.

FIG. 3 is a circuit diagram showing an electrical circuit of the first embodiment of the present invention. FIG. 4 is a time chart showing an operation of the circuit of FIG. 3. Power source terminals T1 and T2 are connected to a commercial power source. A high voltage transformer HT is connected between the power source terminals T1 and T2 through the power source switch SW1, a door switch SW2 and a second normally opened contact RC2. The magnetron M is connected to the high voltage transformer HT. Between a terminal on a non-power source side of the power source switch SWI and the power source terminal T2 are connected a heater H through a thermal switch THS, a blower motor BM and the driving motor CM through a first normally closed contact RC1a are connected. A first normally opened contact RC1b, a second timer contact TC2 and a first relay coil RL1 are connected in series between a terminal on a non-power source side of the door switch SW2 and the power source terminal T2. The start switch SSW is connected in parallel with the first normally opened contact RC1b. One terminal LSa of the limit switch LS is connected to a junction of the first normally opened contact RC1b and the second timer contact TC2 and the first timer motor TM1, the second timer motor TM2 and the second relay coil RL2 through the first timer contact TC1 are connected between the other terminal LSb of the limit switch LS and the power source terminal T2. The thermal switch THS is structured by a bimetal and the like.

In response to turning of the power switch SW1 on, an electrical current is supplied to the heater H through the thermal switch THS. An operating point of the thermal switch THS is adjusted by the temperature adjusting knob THN, so that the temperature of the cooking oil 5 contained in the oil tank 4 is held in the temperature set by the temperature adjusting knob THN. Further, in response to turning of the power switch SW1 on, the blower motor BM for cooling the magnetron M is conducted and the driving motor CM is also conducted through the first normally closed contact RC1a. The driving motor CM raises the rack 11 while the motor CM is conducted and, thus, the table 7 is held at a position over the oil surface.

With such state, the food is placed on the table 7 and the door 2 is closed and, thereafter the first timer knob TMN1 and the second time knob TMN2 are set to the respective desired values. The door switch SW2 is turned on when the door 2 is closed. If and when the first timer knob TMN1 and the second timer knob TMN2 are made to be in a set state, the first timer contact TC1 and the second timer contact TC2 are rendered on states, respectively.

Then, if and when the start switch SSW is operated, the first relay coil RL1 is conducted through the start switch SSW and the second timer contact TC2. At that time, the first relay coil RL1 turns the first normally closed contact RC1a off and the first normally opened contact RC1b on. Since the first normally opened contact RC1b is connected in parallel with the start switch SSW, the conduction of the first relay coil RL1 through the first normally opened contact RC1b is held even if the operation of the start switch SSW is stopped. If and when the first normally closed contact RC1a is turned off, the driving motor CM is de-energized so that the table 7 immediately starts to lower due to its own weight and finally reaches a predetermined position to be lowered. With this state, the food sinks into the cooking oil with high temperature and the detecting switch LS turns on. In response to turning on of the detecting switch LS, the first timer motor TM1 and the second timer motor TM2 are supplied with an electric source and the second relay coil RL2 is also supplied with an electrical power through the first timer contact TC1 in the on state. The second relay coil RL 2 turns the second normally opened contact RC2 on so that the power source is supplied to the high voltage transformer HT of a power source circuit for the magnetron M through the contact RC2, and hence the microwave is generated from the magnetron M.

Accordingly, from the time when the food sinks into the cooking oil, frying of the food by the high temperature oil and heating by the microwave are simultaneously started. In addition, the first timer motor TM1 for determining the time period of microwave irradiation and the second timer motor TM2 for determining the time period for dipping the food into the cooking oil are simultaneously initiated and thus the respective timer operations are started. Normally, the time period for irradiating the microwave is set shorter than that for dipping the food into the oil. Therefore, the time is up in the first timer earlier than in the second timer and hence the first timer contact TC1 turns off, so that the conduction of the second relay coil RL2 is stopped and supplying the microwave is stopped in response to turning off of the second normally opened contact RC2. Meanwhile, although the first timer motor TM1 continues to be energized, it does not affect the OFF state of the first timer contact TC1. Thereafter, the time is up in the second timer and thus the second timer contact TC2 turns off. Therefore, the conduction of the first relay coil RL1 is stopped and hence the first normally closed contact RC1a turns on and the first normally opened contact RC1b turns off. As a result, the driving motor CM is immediately re-energized so that the table 7 is raised. Thus, the food is taken out from the oil and frying of the food by the cooking oil with high temperature is completed. As a result in the foregoing, a frying process including microwave heating is completed.

Meanwhile, although, in the above described embodiment, the microwave output from the magnetron M is constant, the output may be selected by means of well-known technique. This applies to the subsequent embodiments.

As described in the foregoing, in accordance with the present embodiment, dipping of the food into the cooking oil with high temperature within a tightly closed heating chamber can be made automatically for an arbitrary time period and also irradiation of the microwave can be made automatically for an arbitrary time period. In addition, since the timers for determining the above described time periods respectively are initiated after detecting that the food table is completely lowered, which means that the food is automatically dipped into the cooking oil with high temperature, each timer operation becomes more precise and the frying process of the food becomes better.

Although the first timer for setting a time period for supplying the microwave to the heating chamber 1 and the second timer for setting a time period for dipping the table 7 into the oil are simultaneously initiated in response to the detecting switch LS in the above described first embodiment of the present invention, the second timer for setting the time period for dipping the table 7 into the oil may be initiated in response to the time-up of the first timer for setting the time period for supplying the microwave. If so structured, a timer having a shorter time period can be used as the second timer. Such embodiment will be described as the second embodiment in the following, referring to the drawings.

However, in the following we will mainly describe different points from the first embodiment.

Since the internal structure of the second embodiment is the same as that in the above described first embodiment, refer to FIG. 1.

The front structure of the second embodiment is almost the same as the above described front structure of the first embodiment and hence, refer to FIG. 2. However, the brief operation of the first embodiment using FIG. 2 is different, in the following respect, from a brief operation of the second embodiment. That is, a desired time period for irradiating the microwave is set by the first timer knob TMN1 and a desired time period for dipping the food into the oil is set by the second timer knob TMN2. As a result, the microwave is irradiated only for the time period set by the first timer knob TMN1 and, after the timer period set by the second timer knob TMN2 has passed after completion of the microwave irradiation, the table 7 is raised and the food goes away from the oil surface and then the frying of the food is completed.

Figure 5:
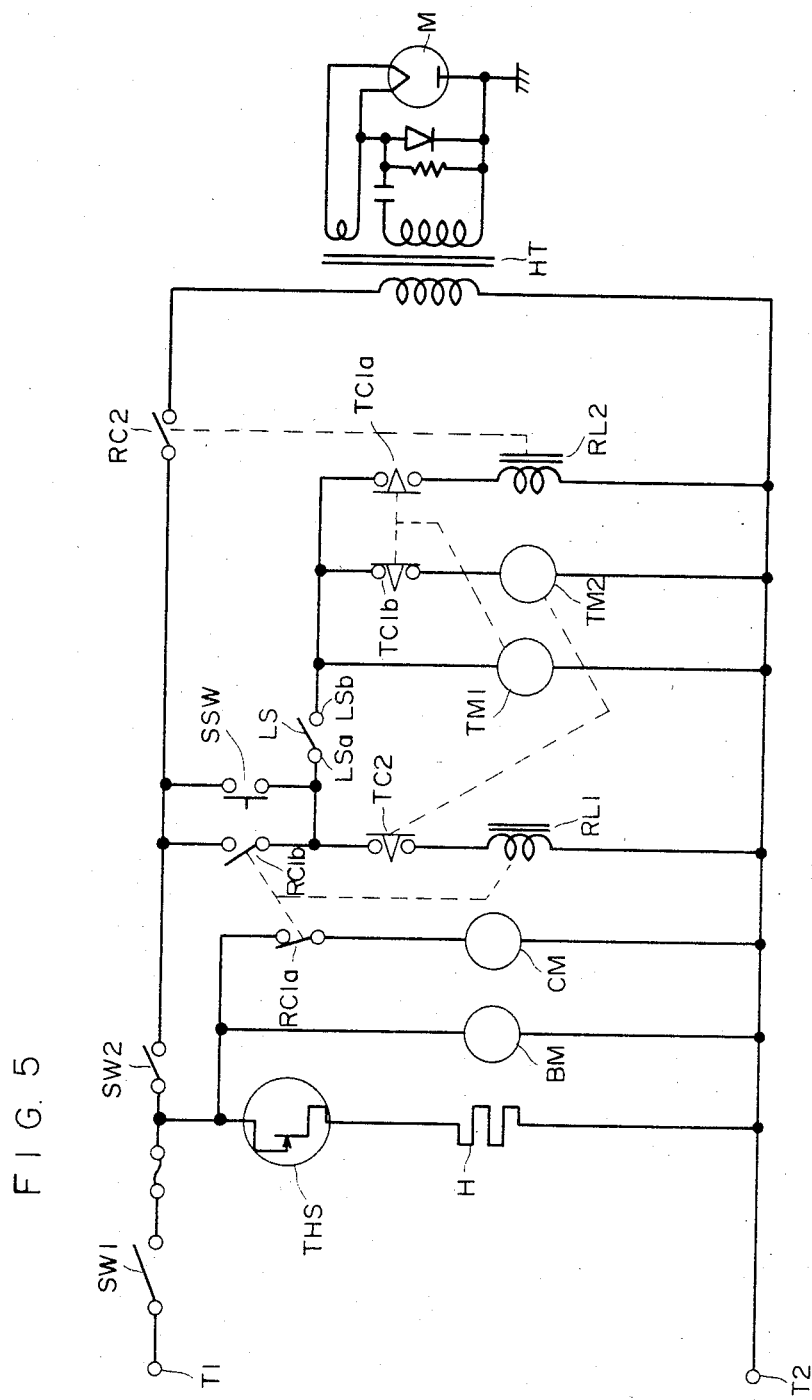
FIG. 5 is a circuit showing an electrical circuit of a second embodiment.
Figure 6:
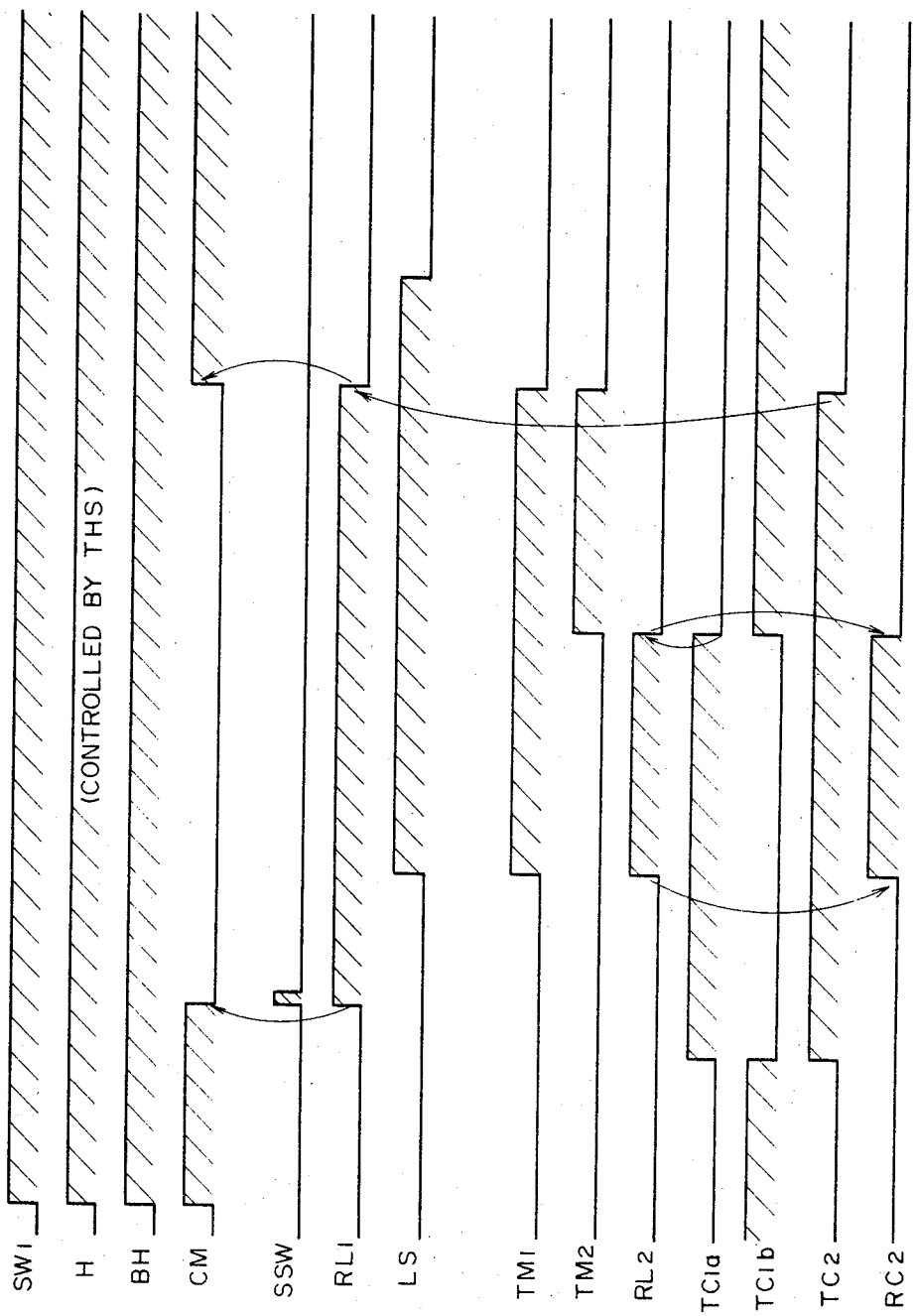
FIG. 6 is a time chart showing an operation of the circuit in FIG. 5.

FIG. 5 is a circuit diagram showing an electrical circuit of the second embodiment of the present invention. FIG. 6 is a time chart showing an operation of the circuit of FIG. 5. We will mainly describe the points different from FIGS. 3 and 4. Between the other terminal LSb of the detecting switch LS and the power source terminal T2 are connected a first timer motor TM1, a second timer motor TM2 through a first normally closed contact TC1b for a timer and a second relay coil RL2 through a first normally opened contact TC1a for the timer. In response to setting of the first timer knob TMN1, the first normally opened contact TC1a turns on and the first normally closed contact TC1b turns off. As similar to the foregoing, the second timer contact TC2 turns on in response to setting of the second timer knob TMN2.

As the same as the above first embodiment, if and when the table 7 reaches a predetermined position to be lowered, the food sinks into the cooking oil with high temperature and the detecting switch LS turns on. As a result, an electric power is applied to the first timer motor TM1 through the first normally opened contact RC1a in an ON state, and is also applied to the second relay coil RL2 through the first normally closed contact TC1b in an ON state. The second relay coil RL2 turns the second normally opened contact RC2 on, so that an electric power is supplied to the high voltage transformer HT in a power source circuit for the magnetron M and hence the microwave is generated from the magnetron M. Accordingly, from the time when the food sinks into the oil, the frying of the food by the oil with high temperature and heating by the microwave are simultaneously initiated and the first timer motor TM1 for determining the time period for irradiating the microwave is driven and the timer operation thereof is started.

If and when the first normally opened contact TC1a turns off and the first normally closed contact TC1b turns on in response to the time-up of the first timer, supplying a power to the second relay coil RL2 is stopped and hence supplying the microwave is also stopped, and at the same time, the second timer motor TM2 is initiated so that the timer operation thereof is started. Thereafter, although the first timer motor TM1 continues to be energized, it does not affect the OFF and ON states of the first timer normally opened and closed contacts TC1a and TC1b, respectively.

Thereafter, if and when the second timer contact TC2 turns off in response to the time-up of the second timer, supplying an electric power to the first relay coil RL1 is stopped and hence the first normally closed contact RC1a turns on and the first normally opened contact RC1b turns off. As a result, the driving motor CM is immediately re-energized so that the table 7 is lifted. Accordingly, the food goes away from the oil and the frying process by the cooking oil with high temperature is completed and hence the whole frying process including the heating by the microwave is completed.

As described in the foregoing, although the second embodiment performs substantially the same operation as that in the first embodiment, the specific feature resides in the point that a timer having a shorter time period can be used as the second timer for setting a time period for dipping the food into the oil.

Meanwhile, in a frying apparatus in which the microwave heating is incorporated, a completed condition of the food often becomes worse, such as the well-fried food oozes with moisture from inner portion thereof, if a further heating is made by the microwave with the completely fried food being taken out. In addition, although a metal made basket is used as a food table, the metal made basket is in the state where it is completely out from the oil when the food is taken out from the oil and the frying operation is completed and even in such case, there are some risks that discharge occurs in the metal-made basket if the microwave is still applied. The first and second embodiments can eliminate such problems. More particularly, as described in the foregoing with reference to FIG. 3, when the food on the table is raised by the driving motor CM, the detecting switch LS is necessarily rendered OFF and hence the relay coil RL2 is de-energized. Correspondingly, the second normally opened contact RC2 is rendered OFF and hence energization of the magnetron M is stopped and the irradiation of the microwave is also stopped. As far as such effect is concerned, the embodiment of FIG. 5 is the same as that in FIG. 3. In addition, a third embodiment which can also eliminate such problem will be described in the following.

Figure 7:
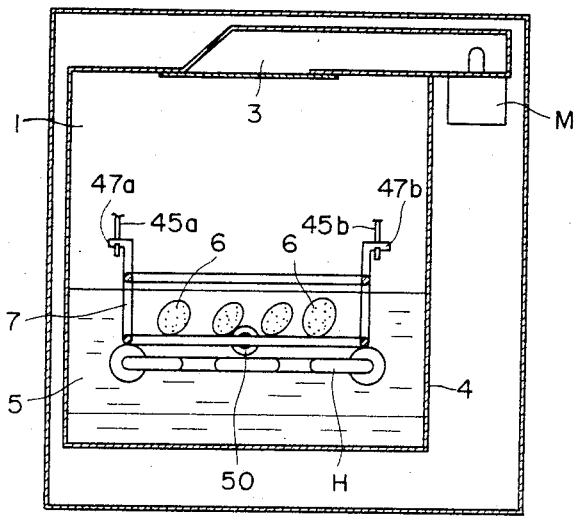
FIG. 7 is a sectional front elevation showing an internal structure of a third embodiment of the present invention.
Figure 8:
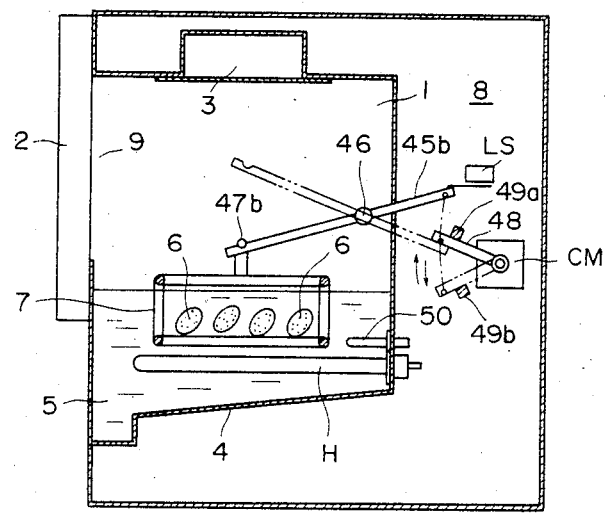
FIG. 8 is a sectional side elevation showing an internal structure of the third embodiment of the present invention.

FIG. 7 is a sectional front elevation showing an interal structure of the third embodiment of the present invention. FIG. 8 is a sectional side elevation showing an internal structure of the third embodiment of the present invention. The lower portion of the heating chamber 1 is formed as an oil tank 4 in which a cooking oil 5 is contained. Although the heating chamber 1 is provided with an entrance 9 for food to be cooked, the entrance 9 is tightly closed by a door 2 in such a manner that the microwave does not leak from the chamber 1. There are provided in the lower portion of the oil tank 4 a heater H for heating the cooking oil 5 and an oil temperature sensor 50 in which a thermistor for sensing the temperature of the cooking oil 5 is contained. Microwave is introduced from the magnetron M into the heating chamber 1 through a feeding port 3. A food table 7, such as a metal-made basket, is provided in the heating chamber 1, the food 6 being placed on the table 7. The table 7 is raised or lowered by a lifting apparatus 8. The lifting apparatus 8 comprises rotatable rods 45a and 45b, a fulcrum shaft 46, suspended shafts 47a and 47b, a driving rod 48, a first stopper 49a, a second stopper 49b, a detecting switch LS and a driving motor CM. The rotatable rods 45a and 45b are coupled to each other for making a pair and are rotatably supported by the fulcrum shaft 46. The suspended shafts 47a and 47b coupled to the table 7 are engaged with one end of the rotatable rods 45a and 45b, respectively, the other end thereof being connected to one end of the driving rod 48. The other end of the driving rod 48 is directly coupled to a driving shaft of the driving motor CM. Rotation of the driving rod 48 is restricted by the first and second stoppers 49a and 49b. If and when an electric power is supplied to the driving motor CM, the driving rod 48 is rotated in a counterclockwise direction by the turning force of the driving motor CM untill the rod 48 abuts on the second stopper 49b. As a result, the rotatable rods 45a and 45b are rotated in the clockwise direction so that the table 7 is raised. On the other hand, if and when supplying an electrical power to the driving motor CM is stopped, no turning force of the driving motor CM is applied, so that the table 7 lowers by its own weight. The lowering of the table 7 is stopped at the time when the driving rod 48 rotates in a clockwise direction and abuts on the first stopper 49a. At that time, the detection switch LS is rendered on.

Figure 9:
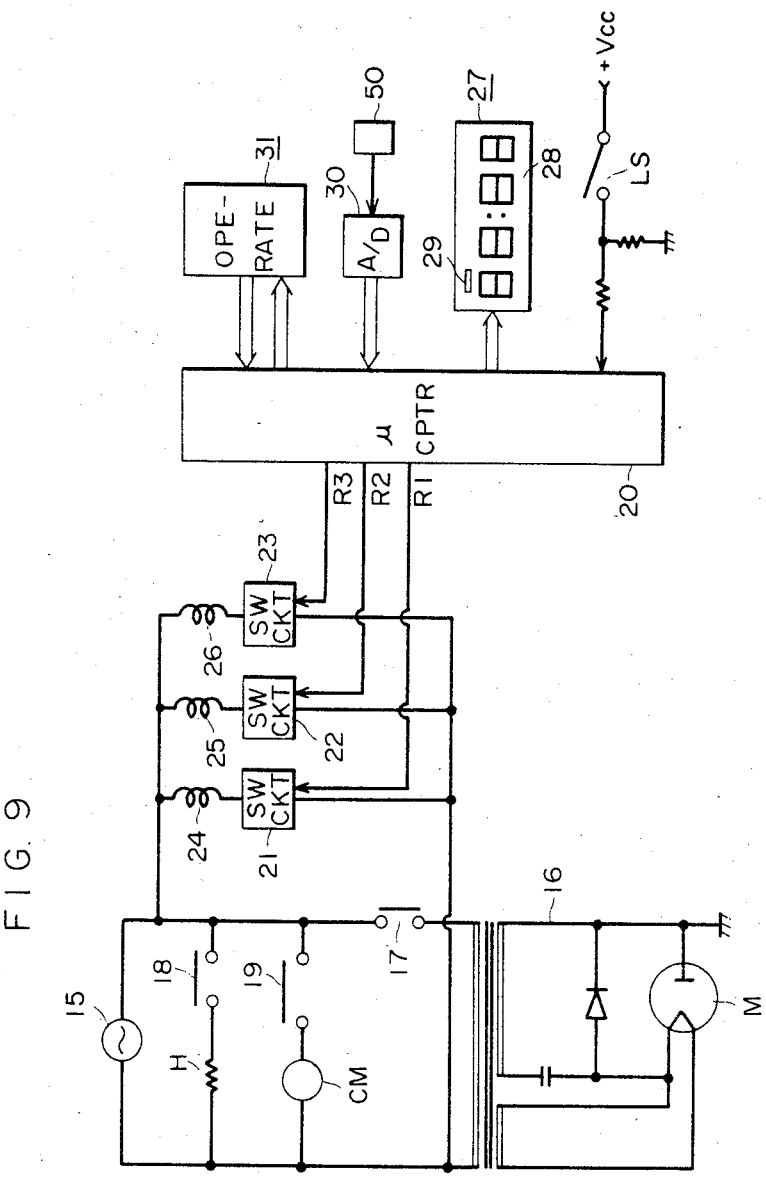
FIG. 9 is a circuit diagram showing an electrical circuit of the third embodiment of the present invention.

FIG. 9 is a circuit diagram showing an electrical circuit of the third embodiment of the present invention. Between both ends of the commercial power supply 15 are connected a high voltage supplying circuit 16 through a first relay switch 17, a heater H through the second relay 18, a driving motor CM through a third relay switch 19, a first relay coil 24 through a first switching circuit 21, a second relay coil 25 through a second switching circuit 22 and a third relay coil 26 through the third switching circuit 23. The magnetron M is connected to the high voltage supplying circuit 16. The first to the third switching circuits 21 to 23 are connected to a microcomputer 20 to which the detecting switch LS, a display 27, an oil temperature sensor 50 through an analog/digital (A/D) converter 30, and an operating portion 31 are connected. The display 27 comprises an eight segmented displaying portion 28 and a displaying portion 29 for displaying temperature suitable for frying. The high voltage supplying circuit 16 supplies a high voltage to the magnetron M. The microcomputer 20 controls a frying apparatus according to the present invention and outputs the first to the third switching signals R1 to R3. The details of the operation of the microcomputer 20 will be described subsequently. The first to the third switching circuits 21 to 23 are rendered on, respectively, by the first to the third switching signals R1 to R3, respectively. The first to the third relay switches 17 to 19 are rendered on, respectively, by the first to the third relay coils 24 to 26, respectively. The display 27 and the operating portion 31 are provided in the front surface of the frying apparatus. The eight segmented displaying portion 28 in the display 27 comprises four displaying portions and displays the remaining period necessary for frying, the temperature of the oil and the like. The analog/digital converter 30 converts an analog output signal from the oil temperature sensor 50 to a digital signal.

Figure 10:
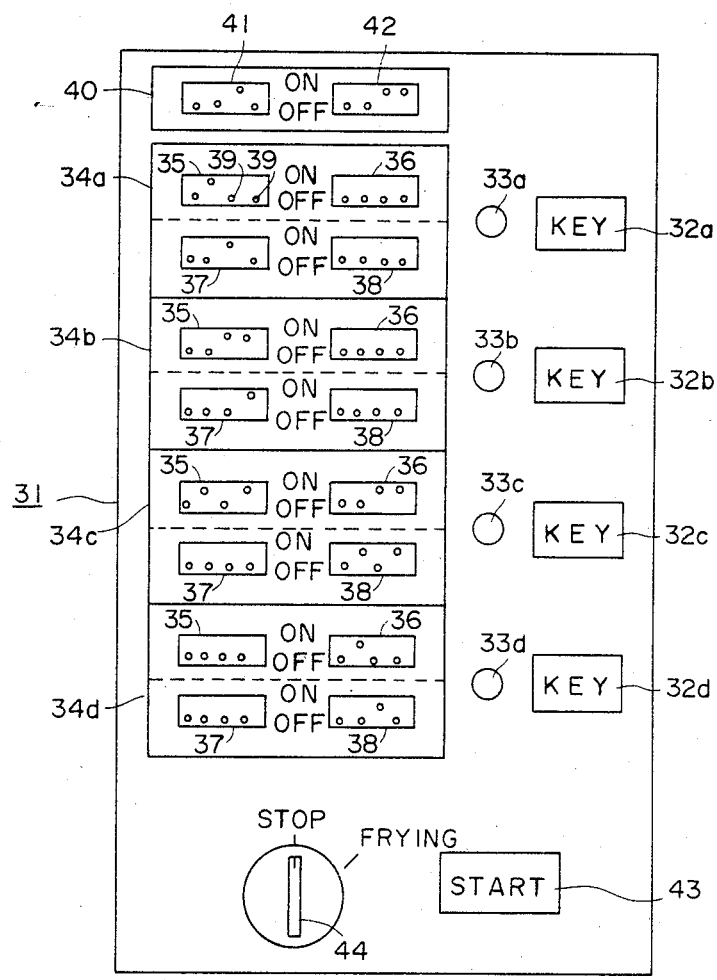
FIG. 10 is a front elevation showing details of an operating portion shown in FIG. 9.

FIG. 10 is a front elevation showing the details of the operating portion 31 shown in FIG. 9. The operating portion 31 comprises first to fourth keys 32a to 32d, first to fourth light emitting diodes 33a to 33d, first to fourth setting portions 34a to 34d, an oil temperature setting portion 40, a start key 43 and a selecting switch 44. The first to fourth setting portions 34a to 34d each comprise first to fourth groups 35 to 38 of switches. The first to fourth groups 35 to 38 of switches each comprise four switches 39. First to fourth manners of fry are designated by the first to fourth keys 32a to 32d, respectively. The first to fourth light emitting diodes 33a to 33d emit light corresponding to the first to fourth keys 32a to 32d, respectively. The first to fourth setting portions 34a to 34d correspond to the first to fourth keys 32a to 32d, respectively and in the setting portions 34a to 34d, the frying time periods and microwave irradiating time periods necessary for the first to fourth manners of the fry are preset. More particularly, in the first group 35 of switches the units digit of minute for the frying time period is set by a signal of 4 bits; in the second group 36 of switches, the tens digit of second for the frying time period is set by a signal of 4 bits; in the third group 37 of switches, the units digit of minute for the microwave irradiating time period is set by a signal of 4 bits; in the fourth groups 38 of switches, the tens digit of second for the microwave irradiating time period is set by a signal of 4 bits. The signals of 4 bits are set based on combinations of the on and off states of the four switches 39. Accordingly, the switches 39 included in each group 35 to 38 of switches are properly set, in advance, to become a combination of the on and off states in the first to fourth setting portions 34a to 34d, so that the frying time period and the microwave irradiating time period for each of the first to fourth frying manner are preset. The oil temperature setting portion 40 comprises fifth and sixth groups 41 and 42 of switches. The fifth group 41 of switches is used for setting the tens digit of the oil temperature and the sixth group 42 of switches is used for setting the units digit of the oil temperature. Since the oil temperature is usually sufficient to be in the level of 100° C. at most for frying, the present embodiment is adopted such that "1" is automatically set as the hundreds digit. Thus, the switch group for setting the hundreds digit is not provided in the present embodiment. However, in order to precisely set the hundreds digit, the switch group may be provided, as necessary. Each of the above described groups 35 to 38, 41 to 42 of switches is usually covered by a detacheable lid (not shown) so that a cook or an operator cannot unnecessarily touch the switches. "STOP" for stopping an operation of the frying apparatus or "FRYING" for enabling an operation of the frying apparatus is selected by the selecting switch 44. The frying is started by the start key 43.

Now, the details of the operation of the third embodiment will be described with reference to FIG. 11. FIG. 11 is a flow chart of a program stored in the microcomputer shown in FIG. 9.

Usually, the selecting switch 44 in the operating portion 31 is in a position of "STOP" and in this case, the program circulates in the steps S1, S2 and S2'. In the step S1, a signal is written into a position register PST in the microcomputer 20 in response to the selected position of the selecting switch 44 and in the step S2, it is determined whether or not the selecting switch 44 is in a position of "STOP" based on the contents in the position register PST. In the step S2', all of the registers and flags in the microcomputer 20 are cleared and the first to the third switching signals R1 to R3 are stopped.

In case where the frying operation is made, first the selecting switch 44 is switched to the "FRYING" position. Then, the program is out of circulation in the steps S1, S2 and S2' and proceeds to the steps S3 to S7. In the step S3, the current operating states of the first to fourth keys 32a to 32d for designating the first to fourth frying manners are detected and the frying time period and the microwave irradiating time period previously set in the first to fourth setting portions 34a to 34d are written into the frying register FRY and the microwave register MCR in the microcomputer 20, respectively. At that time, in case where any of the first to fourth keys 32a to 32d is not operated, the frying time period and the microwave irradiating time period set in the first setting portion 34a are written into the frying register FRY and the microwave register MCR. Accordingly, if and when a frying manner of a high frequency is determined as the first frying manner and the frying time period and the microwave irradiating time period for that frying manner are set in the first setting portion 34a, then the frying time period and the microwave irradiating time period are written into the above described registers, respectively, without operating the first key 32a each time, which simplifies the operation. In this case, if and when any of the first to fourth keys 32a to 32d is not operated, the frying time period and the microwave irradiating time period in the first setting portion 34a are written into the frying register FRY and the microwave register MCR. In this case, the frying time period and the microwave irradiating time period are set as four minutes and two minutes, respectively. In the step S4, the suitable temperature (for example, 123° C.) set in the oil temperature setting portion 40 is written into an oil temperature register BS in the microcomputer 20. In the step S5, only a light emitting diode is emitted which corresponds to a setting portion in which the time period written into the register in the step S3 is set. In this case, for example, the first light emitting diode 33a is emitted so that it is informed that the time periods set by the first setting portion 34a, that is, the time periods for the first frying manner are written into the frying register FRY and the microwave register MCR. In the step S6, the third switching signal R3 is outputted and the driving motor CM is rotated, so that the table 7 starts being raised from the oil. At that time, the detecting switch LS turns off. In the step S7, the oil temperature detected by the oil temperature sensor 50 is written into the detecting register DET in the microcomputer 20 and is displayed in the displaying portion 28 in the display 27. Thereafter, the program proceeds to the step S8.

In the step S8, it is determined whether or not the oil temperature written into the detecting register DET ranges from "the oil temperature set in the oil temperature register BS—a predetermined temperature" to "the oil temperature set in the oil temperature register BS+a predetermined oil temperature". In this case, the oil temperature set in the oil temperature register BS is 123° C. as described in the foregoing and a predetermined temperature is 7° C., for example. In this particular case, assuming that a detected oil temperature is sufficiently low, the program proceeds to the step S9 in which a flag GD for suitable temperature in the microcomputer 20 is cleared. In the step S10, it is determined whether or not the detected oil temperature is over the set oil temperature. In this particular case, the detected oil temperature is smaller than the set oil temperature and thus the program proceeds to the step S11. In the step S11, the second switching signal R2 is outputted and thus heating the cooking oil is started at the temperature of $\theta H$. In the step S12, it is determined whether or not the flag GD is 1. In this particular case, the flag GD is zero and hence the program returns to the step S1 and thus the program circulates in the steps S1 to S12 (hereinafter, such circulation is called the first loop).

Thereafter, the oil is heated to higher temperature and the detected oil temperature changes from the range of "123° C.−7° C." to the range of "123° C.+7° C.". As a result, the program is out of the step S8 in the first loop and then proceeds to the step S13. In the step S13, the flag GD is set to "1" and in the step S14, a suitable temperature displaying portion 29 is lighted in the display 27. In this case, if the detected oil temperature is still smaller than the set oil temperature, the program proceed to the step S12 through the steps S10 and S11. In the step S12, it is determined whether or not the flag GD is 1. In this particular case, the flag GD is already 1, the program proceed to the step S15. In the step S15, it is determined whether or not the current start key 43 is operated and, since it is not operated now, the program returns to the step S1 and thereafter, the program circulates in the steps S1 to S8, S13, S14, S10 to S12 and S15 (hereinafter, such circulation is called the second loop).

If the time passes and the detected oil temperature becomes higher than the set oil temperature, the program is out of the step S10 in the second loop and proceeds to the step S16. In the step S16, outputting of the second switching signal R2 is stopped and hence heating the oil by the heater H is stopped. Thereafter, the program returns to the step S1 through the steps S12 and S15 and thereafter, the program circulates in the steps S1 to S8, S13, S14, S10, S16, S12 and S15 (hereinafter, such circulation is called the third loop).

Therefore, it can be seen that the program circulates in the above described second loop or the third loop depending on whether or not the detected oil temperature is higher than the set oil temperature. It goes without seeing that, during such period, the detected oil temperature ranges from "123° C.−7° C." to "123° C.+7° C.".

A cook confirms such condition through a lighting of a suitable temperature displaying portion 29. In case where the frying operation is performed, the cook simply operates the start key 43 if the frying operation should be made in the first frying manner. In case where the frying operation in a frying manner other than the first frying manner, for example, the third frying manner, is desired, the third key 32c may be operated before the start key 43 is operated. Now, assuming that the frying operation in the first frying manner is performed, in response to operation of the start key 43, the program is out of the step S15 in the above described second or third loop and then proceeds to the step S17. In the step S17, a microwave flag MF in the microcomputer 20 is set to 1 and in the step S18, the third switching signal R3 is stopped so that the table 7 starts to fall by its own weight. The program remains in the step S19 untill the lowering of the table 7 is completed and the detecting switch LS is rendered on, that is, the food 6 enters into the cooking oil 5. Then, if and when the detecting switch LS is rendered on, the program proceeds to the step S20. In the step S20, the frying time period and the microwave irradiating time period in the frying register FRY and the microwave register MCR, respectively, start to be decremented second by second. In the step S21, it is determined whether the microwave flag M is 1 or not and in this particular case, the flag MF is 1 and hence the program proceeds to the step S22. In the step S22, the first switching signal R1 is outputted and the irradiation of the microwave from the magnetron M is initiated, so that the heating of the food by the microwave is started. In the step S23, the detected oil temperature is written into the detecting register DET and the remaining time period of the frying is displayed in the displaying portion 28. The path from the step S24 to the step S25 or the path from the step S24 to the step S26 is the same as the path from the above described step S10 to the step S11 or the path from the step S10 to the step S16. In the step S27, it is determined whether or not the remaining time period for the frying stored in the frying register FRY is 0. Since it is not 0, a program proceeds to the step S28. In the step S28, it is determined whether or not the remaining time period for the microwave irradiation stored in the microwave register MCR is 0. Since it is not 0, the program returns to the step S21 and thereafter the program circulates in the steps S21 to S24, S25 (or S26), S27 and S28 (hereinafter, such circulation is called the fourth loop).

If and when the remaining time period for the microwave irradiation becomes 0, the program is out of the step S28 in the fourth loop and proceeds to the step S29. In the step S29, the microwave flag MF is cleared and the decrementing in the microwave register MCR is stopped. Thereafter, the program returns to the step S21. Since in this particular case, the microwave flag MF is 0, the program proceeds to the step S30. In the step S30, the first switching signal R1 is stopped and hence the heating by the microwave is stopped. Then, the program returns to the step S21 through the steps S23, S24, S25 (or S26), S27 to S29 and the program circulates in the steps S21, S30, S23, S24, S25 (or S26), S27 to S29 (hereinafter, such circulation is called the fifth loop).

If and when the remaining time period for frying becomes 0, the program is out of the step S27 in the above described fifth loop and proceeds to the step S31. In the step S31, the decrementing in the frying register FRY is stopped and the third switching signal R3 is outputted so that the table 7 starts to be raised and the food 6 is taken out from the oil. In addition, at the same time when the table 7 starts to be raised, the first switching signal R1 is stopped so that the microwave irradiation is forced to be stopped even if the microwave is irradiated. Accordingly, the frying operation in the first frying manner is completed. Then, a buzzer (not shown) is rung thereby to inform of the completion of the frying operation. A cook hearing the sound of the buzzer opens the door 2 and takes out the food 6 from the frying apparatus. Thereafter, the program returns to the step S1 and enters into the second or the third loop. Then, the selecting switch 44 is switched to the "STOP" position and hence the program circulates in the steps S1, S2 and S2'.

As can be seen from the foregoing, if the remaining time period for frying becomes 0, the program proceeds to the step 31 in which the microwave irradiation is securely stopped at the same time when the table 7 starts to be raised and, therefore, the microwave irradiation is never being made at the time of completion of the frying operation. This is also the same even if the microwave irradiating time period is erroneously set to be longer than the frying time period in the first to fourth setting portions 34a to 34d, for example.

As described in the foregoing, in accordance with the third embodiment of the present invention, a completed condition of fried food never becomes worse and the above described discharge in the table never occurs even if the table is made of metal and hence it is extremely safe, since the microwave from the magnetron is inhibited from being generated when the food is out of the oil, which is in a non-frying operation.

In a frying apparatus in which heating by a microwave is incorporated, an entrance for food, which is always opened in a conventional frying apparatus having no function of a microwave heating, must be closed by a door in order to prevent leakage of the microwave. For this reason, there is a problem that it is difficult to determine whether or not an amount of a cooking oil is proper in a state where the door is closed. Then a fourth embodiment wherein it is possible to determine whether an amount of a cooking oil is proper even if a door is closed, will be described in the following.

FIG. 12 is a graph showing variation of a temperature in the vicinity of the oil surface in heating a cooking oil, with respect to a various oil temperature. In this graph, the abscissa indicates temperature and the ordinate indicates a position to be measured, the position within the oil being taken in the negative direction with respect to an oil surface. As can be seen from the graph, there is a difference of more than 10° C. between the temperature over the oil surface more than 1 mm far from the oil surface and the temperature in the oil. A fourth embodiment to be described in the following is based on such experiment. The feature thereof resides in the points that there are provided a first thermistor for detecting temperature, which sinks into the oil only when an amount of the oil is proper, and a second thermistor for detecting temperature, which is disposed at a lower position than the first thermistor, so that the lack of the amount of oil can be detected based on the difference between the temperatures detected by the first and the second thermistors.

Figure 13A:
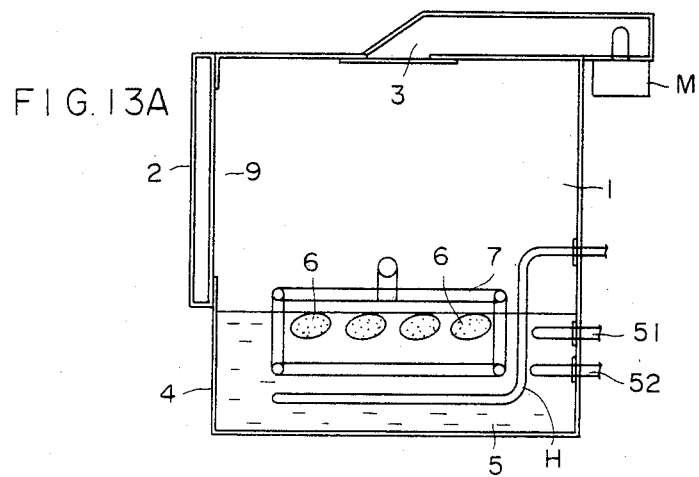
Figure 13B:
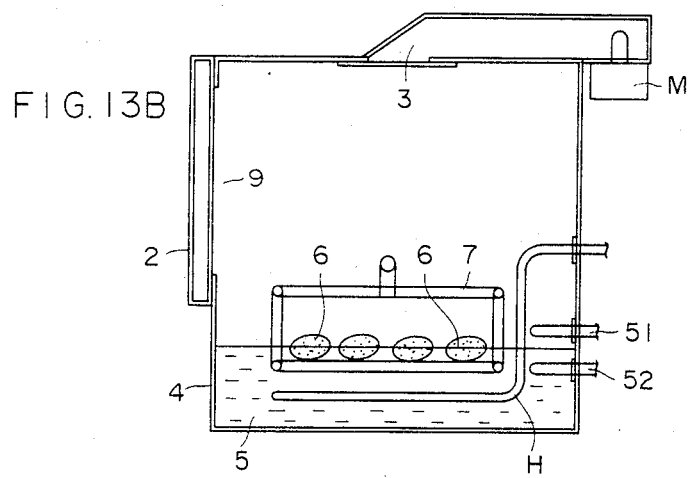

FIG. 13 is a schematic diagram showing an internal structure of the fourth embodiment of the present invention. FIG. 13A is a sectional side elevation when an amount of a cooking oil is proper and FIG. 13B is a sectional side elevation thereof when an amount of a cooking oil is less than a proper amount. A cooking oil tank 4 is formed in a lower portion of the heating chamber 1, a cooking oil 5 being contained in the oil tank 4. The cooking oil 5 is heated by the heater H provided in the lower portion of the oil tank 4. A food entrance portion 9 is provided in the heating chamber 1, which portion 9 is closed by a door 2. Microwave from the magnetron M is introduced into the heating chamber 1 through a feeding port 3. The first and second thermistors 51 and 52 for detecting temperature of the cooking oil 5 are provided in the lower portion of the heating chamber, that is, the lower portion of the oil tank 4. The first thermistor 51 is disposed at the position where the thermistor 51 sinks into the oil only when an amount of the oil is proper, and the second thermistor 52 is disposed at a lower position than the first thermistor 51. A food table 7 on which the food 6 is to be placed is provided within the heating chamber 1, the table 7 being dipped into the oil when the food is being fried, and being taken out from the oil by using a lifting apparatus, not shown, when the food is not fried.

Figure 14:
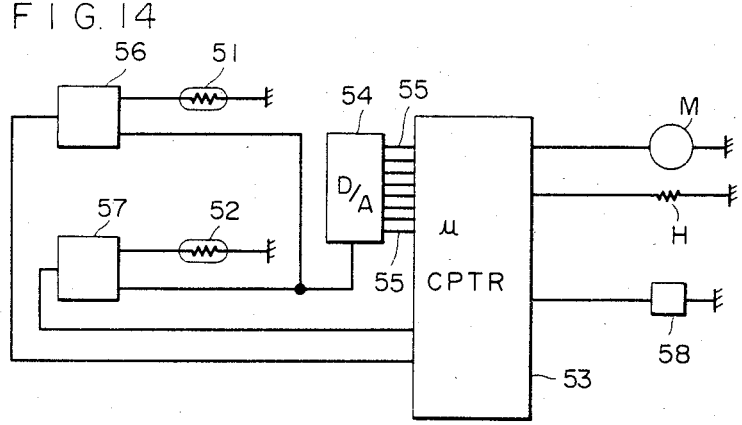
FIG. 14 is a block diagram showing an electrical circuit of the fourth embodiment of the present invention.

FIG. 14 is a block diagram showing an electrical circuit of the fourth embodiment of the present invention. A digital/analog converter circuit 54 is connected through a connecting line 55 to a controlling portion 53 comprising a microcomputer, for example, and, in addition, first and second comparator circuits 56 and 57, an informing apparatus 58, a magnetron M and a heater H are connected to the controlling portion 53. An analog signal outputting portion of the digital/analog converter circuit 54 and a first thermistor 51 for detecting temperature are connected to the first comparator circuit 56. Similarly, an analog signal outputting portion of the digital/analog converter circuit 54 and a second thermistor 52 for detecting temperature are connected to the second comparator circuit 57. The controlling portion 53 applies a reference temperature signal in a digital form through eight connecting lines 55 to the digital/analog converter circuit 54. The digital/analog converter circuit 54 comprises a ladder circuit, for example, and converts the inputted digital signal to an analog signal. The digital signal outputted from the controlling portion 53 is represented as a binary signal of 8 bits, the binary signal for each bit being outputted corresponding to the connecting line 55, respectively. The digital signal of 8 bits varies from "00000000" to "11111111", such each signal being adapted such that the numeric value converted to decimal number corresponds to a value of temperature. More particularly, the "00000000" signal corresponds to 0° C., "00000001" corresponds to 1° C., the "00000010" corresponds to 2° C., and the "11111111" corresponds to 255° C. The first comparator circuit 56 compares the reference temperature signal from the digital/analog converter circuit 54 with a temperature signal from the first thermistor 51, and outputs the compared result to the controlling portion 53. Similarly, the second comparator circuit 57 compares the reference temperature signal from the digital/analog converter circuit 54 with the temperature signal from the second thermistor 52, and outputs the compared result to the controlling portion 53. The informing apparatus 58 comprises a buzzer, for example, and informs of the lack of the oil amount. The controlling portion 53 also controls the magnetron M, the heater H and the informing apparatus 58.

Now, a brief operation for the circuit of FIG. 14 will be described. It is determined in the controlling portion 53 whether or not the temperature difference between the temperatures T1 and T2 measured, for each predetermined time period, by the first and second thermistors 51 and 52 exceeds predetermined temperature and, when the above described predetermined temperature difference is continuously measured several times, the informing apparatus 58 informs of the lack of oil amount. The present embodiment is structured such that the above described predetermined time period is one second and the above described predetermined temperature difference is 10° C. and also an informing is made when such temperature difference is continuously measured four times. The reason why the predetermined time period is set as one second is that one second is necessarily sufficient for detecting the above described predetermined temperature difference and the reason why the predetermined temperature difference is set as 10° C. is based on the explanation of FIG. 12. In addition, since erroneous measurement due to waving of oil surface should be corrected, the number of continuous measuring times of the temperature difference is set as four. However, the present embodiment is not intended to be restricted to such example of one second, 10° C. and four times.

FIG. 15 is a flow chart of a program for detecting an amount of an cooking oil, stored in a read only memory in the controlling portion 53 shown in FIG. 14. Such program comprises a temperature measuring portion A1 including the steps S51 to S59 and an oil amount detecting portion A2 including the steps S60 to S64.

First of all, an operation of the temperature detecting portion A1 will be described. If and when a cooking is started, in the step S51, the heater H and the magnetron M are rendered on and all of the contents in an oil surface temperature region, an oil temperature region, a reference temperature region and CNT in a random access memory in the controlling portion 53 are cleared. The CNT is a region for storing the number of times when the temperature T2 measured by the second thermistor 52 becomes more than 10° C. higher than the temperature T1 measured by the first thermistor 51. Meanwhile, eventually, the temperature T1 measured by the first thermistor 51 and the temperature T2 measured by the second thermistor 52 are stored in the oil surface temperature region and the oil temperature region, respectively. The reference temperature regions is a region including 8 bits for storing a digital signal which is a reference temperature signal outputted from the controlling portion 53. In the step S52, the reference signal in the reference temperature region is outputted to the digital/analog converter circuit 54 in which the reference signal is converted to an analog signal, the converted reference signal being outputted to the first and second comparator circuits 56 and 57. In the step S53, the first comparison of the temperature is made. More particularly, the temperature signal corresponding to the temperature T2 obtained from the second thermistor 52 is compared with the reference signal inputted from the digital/analog converter circuit 54 in the second comparator circuit 57. In case where the temperature T2 is larger, the program proceeds to the step S54 in which a content in the oil temperature region is incremented by 1 and then the program proceeds to the step S55.

In the step S55, the second comparator of temperature is made. More particularly, the temperature signal corresponding to the temperature T1 obtained from the first thermistor 51 is compared with the reference signal inputted from the digital/analog converter circuit 54 by the first comparator circuit 56. If and when the temperature T1 is larger, the program proceeds to the step S56 in which the content in the oil surface temperature region is incremented by 1 and then the program proceeds to the step S57. In case where the reference signal outputted from the digital/analog converter circuit 54 is larger in the step S55, the program proceeds to the step S57. In the step S57, the content in the reference temperature region is incremented by 1. More particularly, such operation increases the temperature corresponding to the signal outputted from the digital/analog converter circuit 54 by 1° C. Thereafter, the program proceeds to the step S58.

In case where the temperature signal from the second thermistor 52 is smaller than the reference signal from the digital/analog converter circuit 54 in the comparing process in the step S53, the program proceeds to the step S59. In the step S59, as similar to the step S55, the reference signal from the digital/analog converter circuit 54 is compared with the temperature signal from the first thermistor 51 and if the former is larger, the program proceeds to the step S58 and if the latter is larger, the program proceeds to the step S58 through the step S56 and S57.

In the step S58, it is determined whether one second has passed from the starting point of cooking. Such determination is made for the purpose of performing an operation of an oil amount detecting portion A2 based on the temperatures (the contents in the oil surface temperature region and the oil temperature region) measured by the temperature measuring portion A1 for each second from the starting point of cooking. In the above described temperature measuring portion A1, if and when the temperatures T1 and T2 measured by the first and second thermistors 51 and 52, respectively are both higher than the reference temperature corresponding to the content in the reference temperature region, the program circulates in the first loop including the steps S52 to S58. At that time, in the steps S54, S56 and S57, the content in the oil temperature region, the oil surface temperature region and the reference temperature region are incremented one by one.

Thereafter, if and when only the temperature T1 measured by the first thermistor 51 becomes smaller than the above described reference temperature, the program circulates in the second loop including the steps S52 to S55, S57 and S58. If and when only the temperature T2 measured by the second thermistor 52 becomes smaller than the above described reference temperature, the program circulates in the third loop including the steps S52, S53, S59 and S56 to S58. In addition, if and when the temperatures T1 and T2 become smaller than the reference temperature, a program circulates in the fourth loop including the steps S52, S53, S59 and S58.

Meanwhile, in the step S51, the oil surface temperature region, the oil temperature region and the reference temperature region are all cleared to "0" and thus, the contents in the reference temperature region thereafter correspond to the value of temperature converted to a decimal value. Usually, the oil temperature in the oil tank 4 is over 0° C. In addition, only one second is sufficient for adding the contents in the reference temperature region to the value from "00000000" to "11111111" in order in the above described temperature measuring portion A1 and for comparing the 256 reference signals corresponding to 0° C. to 255° C. based on the contents concerning the reference temperature region with the measured temperature signals from the first and second thermistors 51 and 52, respectively.

Accordingly, if and when the loop including the above described steps S52 to S59 are executed for one second, the temperature T1 measured by the first thermistor 51 and the temperature T2 measured by the second thermistor 52 are stored in the oil surface temperature region and the oil temperature region, respectively. Each time the loop operation is executed for one second in the temperature measuring portion A1, the program proceeds to the step S60 in the oil amount detecting portion A2 from the step S58.

In the following, an operation for the oil amount detecting portion A2 will be described. In the step S60, the third comparison of temperature is made. More particularly, the content T1 in the oil surface temperature region is subtracted from the content T2 in the oil temperature region and it is determined whether or not the reference thereof is more than 10° C. In such determination, if and when the temperature T2 is more than 10° C. higher than the temperature T1, it is determined than the oil amount in the oil tank 4 is less than a proper amount and thus the program proceeds to the step S61. In the step S61, a content in the CNT is incremented by 1 and the program proceeds to the step S62. In the step S62, it is determined whether or not the content in the CNT is 4. Such determination is made for the purpose of seeing whether the number of continuous times when the temperature difference between the temperature T2 and the temperature T1 is more than 10° C. (T2>T1). If and when the content in the CNT becomes 4, the informing apparatus 58 informs of lack of the oil amount. If not, the program proceeds to the step S64.

On the other hand, if and when it is determined that the temperature difference between the temperatures T1 and T2 is less than 10° C. in the step S60, the program proceeds to the step S63. In the step S63, the content in the CNT is cleared to "0" and then the program proceeds to the step S64.

In the step S64, the contents in the oil surface temperature region, the oil temperature region and the reference temperature region are cleared to "0" and then the program returns to the step S52. Then the program again circulates in the steps S52 to S64 so that the measured temperatures obtained from the first and the second thermistors 51 and 52 are compared for each second. If and when, at that time, the situations occurs continuously four times where the measured temperature from the first thermistor 51 is more than 10° C. lower than that from the second thermistor 52, it is informed that an abnormal situation occurs so that the informing apparatus informs of lack of oil, while the cooking is stopped. More particularly, irradiation of microwave is stopped and the table is raised.

Accordingly, in the fourth embodiment, the temperature measured by the first thermistor 51 is more than 10° C. lower than that in the second thermistor 52 (in this case, the oil surface is in a position of several millimeters under the position of the first thermistor 51), if the amount of oil decreases and becomes less than an appropriate amount. If and when such situation continues at least four times, the value in the CNT becomes "4" in the oil amount detecting portion A2 and hence an abnormal state, such as lack of oil amount, is reported. In addition, since a report informing of an abnormal state is not given until the value of the CNT becomes "4", no report informing of an abnormal state is not made even if the first thermistor 51 goes instantaneously out of the oil due to waving of the oil surface and the measured temperature decreases although the amount of cooking oil is proper. Therefore, an erroneous operation never occurs.

In addition, in the present embodiment, the control of the oil temperature is made by controlling the heater H by means of the controlling portion 53, based on the measured value from the second thermistor 52. Furthermore, heating by the microwave from the magnetron M is also controlled by the controlling portion 53.

Although an approach for detecting an amount of oil by investigating the degree of increase and decrease of the detected temperature using only the first thermistor 51 may be considered, heat radiation from the thermistor must be considered if the oil surface is disposed in the vicinity of the thermistor and hence the control thereof becomes very difficult. In addition, since the oil temperature cannot be set if the oil amount is out of a proper amount, that is, if the thermistor is out of the oil, there is a fear that the oil temperature becomes more than the desired temperature before the lack of oil amount is detected. Furthermore, in any approach for detecting the oil amount by only the thermistor disposed such that it sinks into the oil only when the oil amount is proper, there is still a fear that the oil temperature becomes higher than a desired temperature if the oil amount is less than a proper amount. As described in the foregoing, in accordance with the fourth embodiment, it can be determined, with the door being closed, whether the oil amount is proper or not. In addition, even if the oil surface is in the vicinity of the first thermistor, the control of detection of oil amount is simple and the detection of oil temperature is made by the second thermistor which is always in the oil and thus the oil temperature never becomes higher than a desired temperature.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A frying apparatus for frying food, comprising:
   a heating chamber for housing food, said heating chamber being substantially leakproof to microwave energy, said heating chamber having a lower portion for containing cooking oil;
   heater means provided in said lower portion for heating cooking oil;
   microwave supplying means coupled to said heating chamber for supplying microwave energy to said heating chamber;
   food table disposed within said heating chamber for holding food therein, said food table being moveable to be lowered to a first position at which said food is dipped into said oil, and raised to a second position at which said food is raised out of said oil;
   lifting means coupled to said table for lowering said table to said first position and raising it to said second position;
   initiating means for initiating frying operations of said food;
   position detecting means for detecting that said food table is in said first position and for providing a detection output indicative thereof;
   frying operation period restricting means for restricting a frying operation period when said food is dipped into said oil and fried in said first position; and
   controlling means coupled to said heater means, said microwave supplying means, and said lifting means comprising enabling means for controlling supply of electric power to said heater means and to said microwave supplying means for disabling said microwave supplying means when said food table means is not in said first position and means for providing automatic control of said lifting means such that said food table is lowered to said first position in response to said initiating means so that said position detecting means provides said detection output, and thereafter, said food table is held in said first position until said frying operation period restricting means determines termination of said frying operation period and then said food table is raised to said second position when said determination is made by said frying operation period restricting means.

2. A frying apparatus in accordance with claim 1 wherein said controlling means comprises
   first timer means for setting a time period while said microwave supplying means is to be enabled, and said frying operation period restricting means comprises second timer means for setting a time period while the table is in said first position.

3. A frying apparatus in accordance with claim 2, wherein
said microwave supplying means enabling means enables said microwave supplying means after said position detecting signal is generated, and
said first and second timer means initiate a timer operation after detection of said position detecting means signal.

4. A frying apparatus in accordance with claim 3, wherein
said first and second timer means simultaneously start timing operation responsive to said position detecting signal.

5. A frying apparatus in accordance with claim 3, wherein
said controlling means raises the table to said second position after time-up of said first and second timers.

6. A frying apparatus in accordance with claim 4, wherein
said controlling means raises the table to said second position after time-up of said first and second timers.

7. A frying apparatus in accordance with claim 2, wherein
said controlling means disables said microwave supplying means when said table is not in said first position.

8. A frying apparatus in accordance with claim 3, wherein
said controlling means disables said microwave supplying means when said position detecting signal is not generated.

9. A frying apparatus in accordance with claim 4, wherein
said controlling means disables said microwave supplying means when said position detecting signal is not generated.

* * * * *